United States Patent
Hosamani et al.

(10) Patent No.: US 11,153,228 B1
(45) Date of Patent: Oct. 19, 2021

(54) SYNCHRONIZING DEVICE RESOURCES FOR ELEMENT MANAGEMENT SYSTEMS

(71) Applicant: Juniper Networks, Inc., Sunnyvale, CA (US)

(72) Inventors: Vijaya Kumar Hosamani, Bangalore (IN); Vinaya Kumar Kathireddy, Bangalore (IN); Adithya Shasa Sai Seerapu, Visakhapatnam (IN)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 125 days.

(21) Appl. No.: 16/711,423

(22) Filed: Dec. 11, 2019

(51) Int. Cl.
*H04L 12/911* (2013.01)
*H04L 12/24* (2006.01)

(52) U.S. Cl.
CPC .......... *H04L 47/782* (2013.01); *H04L 41/082* (2013.01); *H04L 41/0893* (2013.01); *H04L 41/12* (2013.01)

(58) Field of Classification Search
CPC . H04L 47/782; H04L 41/082; H04L 41/0893; H04L 41/12
See application file for complete search history.

(56) References Cited

U.S. PATENT DOCUMENTS

| | | | |
|---|---|---|---|
| 7,804,832 | B2 | 9/2010 | Andrews et al. |
| 8,090,809 | B2 | 1/2012 | Tan et al. |
| 10,095,559 | B2 | 10/2018 | Gambardella et al. |
| 10,200,248 | B1 | 2/2019 | Jiang et al. |
| 10,374,886 | B1 | 8/2019 | A et al. |
| 10,546,405 | B2 * | 1/2020 | Herman ................. G06T 13/40 |
| 2007/0067201 | A1 * | 3/2007 | Malewicz ............. G06Q 10/06 705/7.17 |
| 2011/0088034 | A1 * | 4/2011 | Vernier ................. G06F 9/5038 718/100 |
| 2015/0019991 | A1 | 1/2015 | Kristjansson |
| 2015/0358198 | A1 * | 12/2015 | Mahajan ............. H04L 41/0813 709/221 |

(Continued)

OTHER PUBLICATIONS

Harrington et al., "An Architecture for Describing Simple Network Management Protocol (SNMP) Management Frameworks," RFC 3411, Network Working Group, Dec. 2002, 65 pp.

(Continued)

*Primary Examiner* — Duc C Ho
(74) *Attorney, Agent, or Firm* — Shumaker & Sieffert, P.A.

(57) ABSTRACT

An example controller device that manages a plurality of network devices includes one or more processors implemented in circuitry and configured to: determine that configuration of one or more network devices of the plurality of network devices is to be updated; determine dependencies between types of resources provided by the network devices; construct a directed acyclic graph (DAG) representing the dependencies, the DAG having nodes representing the corresponding types of resources of the network devices of the plurality of network devices; sort the nodes of the DAG according to a grouped topological sort into a plurality of hierarchical levels according to the dependencies; and submit queries for two or more resources of the network devices at a common level of the plurality of hierarchical levels in parallel to determine resources of the determined types of resources of the two or more resources to configure the two or more network devices.

20 Claims, 8 Drawing Sheets

(56) References Cited

U.S. PATENT DOCUMENTS

| | | |
|---|---|---|
| 2015/0381515 A1 | 12/2015 | Mattson et al. |
| 2016/0246582 A1 | 8/2016 | Benton |
| 2016/0328433 A1 | 11/2016 | Wang et al. |
| 2017/0053294 A1 | 2/2017 | Yang et al. |
| 2017/0163502 A1 | 6/2017 | MacNeil et al. |
| 2018/0203944 A1 | 7/2018 | Hawkes et al. |
| 2019/0139181 A1* | 5/2019 | Virolainen ............ G06F 9/5066 |

OTHER PUBLICATIONS

U.S. Appl. No. 15/462,465, Juniper Networks, Inc. (Inventor: Chandrasekhar A) filed Mar. 17, 2017.

U.S. Appl. No. 16/125,245, Juniper Networks, Inc. (Inventor: Chandrasekhar A) filed Sep. 7, 2018.

U.S. Appl. No. 16/282,160, Juniper Networks, Inc. (Inventor: Chandrasekhar A) filed Feb. 21, 2019.

Enns, "NETCONF Configuration Protocol," Network Working Group, RFC 4741, Dec. 2006, 96 pp.

Bjorklund, "Yang—A Data Modeling Language for the Network Configuration Protocol (NETCONF)," Internet Engineering Task Force, RCF 6020, Oct. 2010.

"Gremlin Docs," gremlindocs.spmallette.documentup.com, retrieved on Mar. 29, 2019, 34 pp.

"Gremlin," Github, github.com/tinkerpop/gremlin/wiki, Jul. 11, 2016, 4 pp.

"Openconfig," openconfig.net, 2016, 1 pp. (Applicant points out, in accordance with MPEP 609.04(a), that the year of publication, 2016, is sufficiently earlier than the effective U.S. filing date, so that the particular month of publication is not in issue.).

"OpenConfig," Github, github.com/openconfig, retrieved on Mar. 29, 2019, 3 pp.

U.S. Appl. No. 16/370,243, Juniper Networks, Inc. (Inventor: Chandrasekhar A) filed Mar. 29, 2019.

Bierman et al., "RESTCONF Protocol," IETF, RFC 8040, Jan. 2017, 137 pp.

"Introduction to GraphQL," https://graphql.org/learn/, Accessed Sep. 20, 2018, 3 pp.

Byron, "GraphQL: A data query language," https://code.fb.com/core-data/graphql-a-data-query-language/, Posted Sep. 14, 2015, 5 pp.

IEEE 802.11ad, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", IEEE Computer Society, Dec. 28, 2012, 628 pp.

U.S. Appl. No. 16/456,976, Juniper Networks, Inc. (Inventor: Chandrasekhar A) filed Jun. 28, 2019

U.S. Appl. No. 16/144,313, Juniper Networks, Inc. (Inventor: Chandrasekhar A) filed Sep. 27, 2019.

"Recurrent Layers—Keras Documentation," Keras, accessed on Nov. 30, 2016, from https://keras.io/layers/recurrent/, 5 pp.

Sutskever, et al., "Sequence to Sequence Learning with Neural Networks," Proceeding NIPS'14 Proceedings of the 27th International Conference on Neural Information Processing Systems, Dec. 8-13, 2014; pp. 3104-3112.

"Tinkerpop/Gremlin Wiki," GitHub, edited on Jul. 11, 2016, retrieved from https://github.com/tinkerpop/gremlin/wiki, 3 pp.

"GremlinDocs," retrieved on Jan. 27, 2017, from htttp://gremlindocs.spmallette.documentup.com/, 34 pp.

"Ensuring 802.11n and 802.11a/b/g Compatibility," Fluke networks, retrieved from http://www.flukenetworks.com/content/ensuring-80211n-and-80211abg-compatibility, May 1, 2008, 10 pp.

U.S. Appl. No. 16/370,189, Juniper Networks, Inc. (Inventor: Chandrasekhar A) filed Mar. 29, 2019.

\* cited by examiner

SYNCHRONIZING DEVICE RESOURCES FOR ELEMENT MANAGEMENT SYSTEMS

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs), NMS devices, also referred to as element management systems (EMSs), EMS devices, controllers, or controller devices, may support these services such that an administrator can easily create and manage these high-level network configuration services.

User configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intent data models can be represented as connected. In this manner, business policies can be implemented across intent data models. When intents are modeled using a unified graph model, extending new intent support needs to extend the graph model and compilation logic.

SUMMARY

In general, this disclosure describes techniques for managing network devices. A network management system (NMS) device, also referred to herein as an element management system (EMS) device or, more generally, a controller device; may configure network devices using low-level (that is, device-level) configuration data, e.g., expressed in Yet Another Next Generation (YANG) data modeling language. Moreover, the controller device may manage the network devices based on the configuration data for the network devices. According to the techniques of this disclosure, the controller device may construct a data structure (e.g., a sorted directed acyclic graph (DAG)) to use to submit queries to managed network elements (that is, managed network devices) in parallel, and only submitting queries to a subset of the managed network elements at any one time.

In one example, a method of managing a plurality of network devices includes determining that configuration of one or more network devices of the plurality of network devices is to be updated; determining dependencies between types of resources provided by the network devices; constructing a directed acyclic graph (DAG) representing the dependencies, the DAG having nodes representing the corresponding types of resources of the network devices of the plurality of network devices; sorting the nodes of the DAG according to a grouped topological sort into a plurality of hierarchical levels according to the dependencies; and submitting queries for two or more resources of the network devices at a common level of the plurality of hierarchical levels in parallel to determine resources of the determined types of resources of the two or more resources to configure the two or more network devices.

In another example, a controller device manages a plurality of network devices. The controller device includes one or more processors implemented in circuitry and configured to determine that configuration of one or more network devices of the plurality of network devices is to be updated; determine dependencies between types of resources provided by the network devices; construct a directed acyclic graph (DAG) representing the dependencies, the DAG having nodes representing the corresponding types of resources of the network devices of the plurality of network devices; sort the nodes of the DAG according to a grouped topological sort into a plurality of hierarchical levels according to the dependencies; and submit queries for two or more resources of the network devices at a common level of the plurality of hierarchical levels in parallel to determine resources of the determined types of resources of the two or more resources to configure the two or more network devices.

In another example, a computer-readable storage medium has stored thereon instructions that, when executed, cause a processor of a controller device that manages a plurality of network devices to determining that configuration of one or more network devices of the plurality of network devices is to be updated; determining dependencies between types of resources provided by the network devices; constructing a directed acyclic graph (DAG) representing the dependencies; the DAG having nodes representing the corresponding types of resources of the network devices of the plurality of network devices; sorting the nodes of the DAG according to a grouped topological sort into a plurality of hierarchical levels according to the dependencies; and submitting queries for two or more resources of the network devices at a common level of the plurality of hierarchical levels in parallel to determine resources of the determined types of resources of the two or more resources to configure the two or more network devices.

The details of one or more examples are set forth in the accompanying drawings and the description below. Other features, objects, and advantages will be apparent from the description and drawings, and from the claims.

DETAILED DESCRIPTION

In a network management system (NMS) or element management system (EMS) application executed by an NMS or EMS device, respectively, inventory synchronization may be used to keep resources in synch with details of managed devices (or elements) that provide the resources. The resources may have interdependencies between each other that an EMS or NMS device may manage in such a way that a number of objects in memory of the EMS or NMS device and the time taken to query the objects is minimal, and to optimally handle a number of parallel queries to the managed devices.

Figure 1:
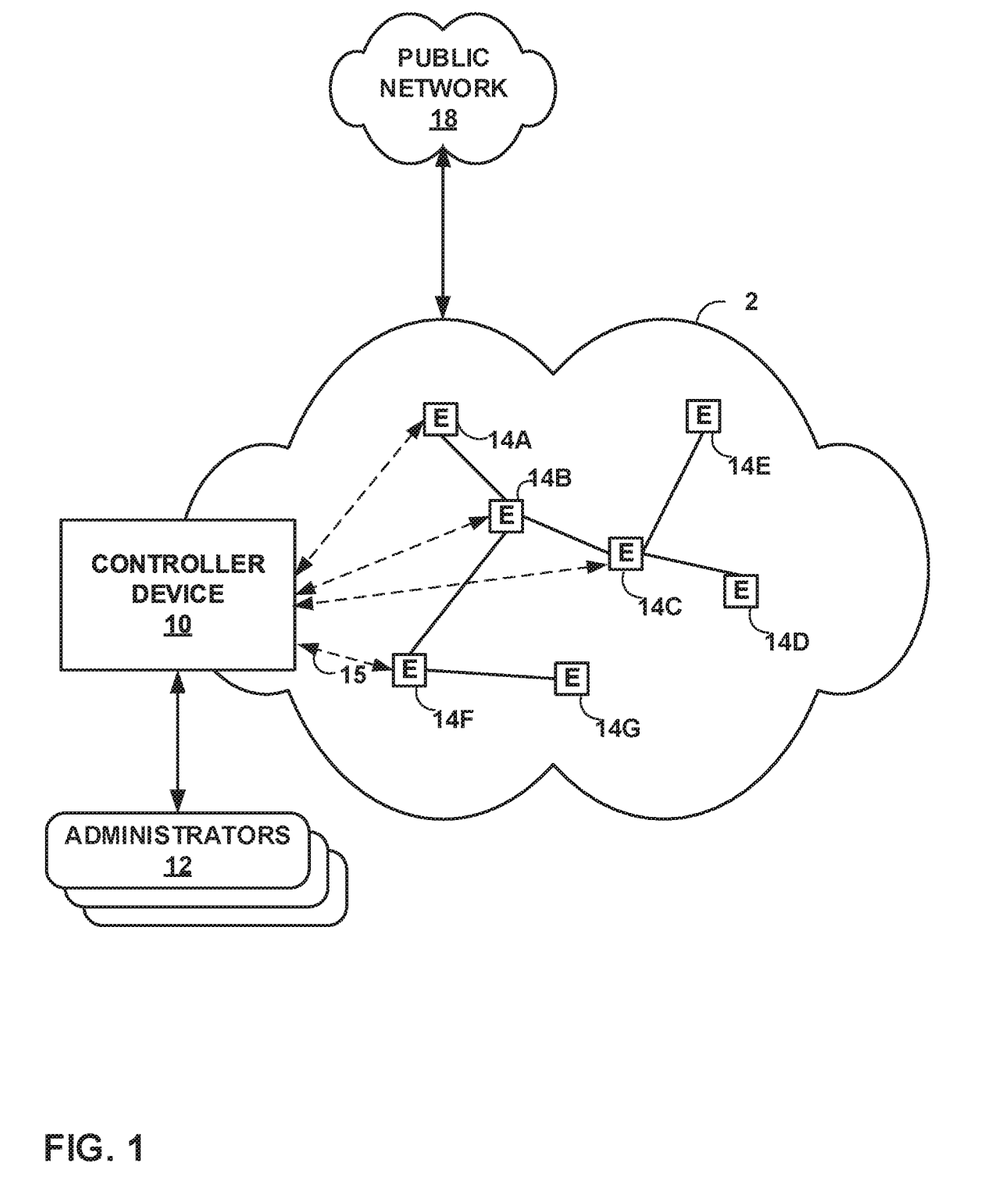
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrators 12 uses controller device 10 (or multiple such management devices) to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. As another example, Network Configuration Protocol (NETCONF) provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference.

Controller device 10 may also referred to as a network management system (NMS), NMS device, element management system (EMS), or EMS device. Elements 14 are centrally maintained by an IT group of the enterprise. Administrators 12 interacts with controller device 10 to remotely monitor and configure elements 14. For example, administrators 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (IMP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrators 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrators 12 uses controller device 10 to configure elements 14 to specify certain operational characteristics that further the objectives of administrators 12. For example, administrators 12 may specify for an element 14 a particular operational policy, regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNAP protocol, NETCONF protocol, or a derivative thereof, such as the Juniper Device Management Interface, to perform the configuration. Controller device 10 may establish NETCONF sessions with one or more of elements 14.

Controller device 10 may be configured to compare a new intent data model to an existing (or old) intent data model, determine differences between the new and existing intent data models, and apply the reactive mappers to the differences between the new and old intent data models. In particular, controller device 10 determines whether the new data model includes any additional configuration parameters relative to the old intent data model, as well as whether the new data model modifies or omits any configuration parameters that were included in the old intent data model.

The intent data model may be a unified graph model, while the low-level configuration data may be expressed in YANG, which is described in Bjorklund, "YANG A Data Modeling Language for the Network Configuration Protocol (NETCONF)," Internet Engineering Task Force, RFC 6020, October 2010, available at tools.ietf.org/html/rfc6020. In some examples, the intent data model may be expressed in YAML Ain't Markup Language (YAML). Controller device 10 may include various reactive mappers for translating the intent data model differences. These functions are configured accept the intent data model (which may be expressed as structured input parameters, e.g., according to YANG or YAML). The functions are also configured to output respective sets of low-level device configuration data model changes, e.g., device configuration additions and removals. That is, $$y1=f1(x), y2=f2(x), \ldots yN=fN(x).$$

Controller device 10 may use YANG modeling for intent data model and low-level device configuration models. This data may contain relations across YANG entities, such as list items and containers. As discussed in greater detail below, controller device 10 may convert a YANG data model into a graph data model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the unified intent data model. Controller device 10 may be configured to use the same compilation logic for each of create, update, and delete as applied to the graph model.

In general, controllers, like controller device 10, use a hierarchical data model for intents, low-level data models, and resources. The hierarchical data model can be based on YANG or YAML. The hierarchical data model can be represented as a graph, as discussed above. Modern systems have supported intents to ease the management of networks, Intents are declarative. To realize intents, controller device 10 attempts to select optimal resources. Customer environments may be configured to allow customers (e.g., administrators 12) to control intent realization and assure programmed intents.

In some examples, controller device 10 may construct a graph data model by querying elements 14 to determine resources provided by elements 14. Controller device 10 may generally be configured with information representing types of resources provided by each of elements 14, but may query elements 14 to determine specific resource information for resources matching each of the types of resources provided by elements 14. In particular, controller device 10 may perform the techniques of this disclosure to query elements 14 in parallel and in a manner that reduces memory consumption for storing portions of the graph data model. That is, controller device 10 may store only portions of the graph data model in memory that are needed for processing (e.g., configuration), then remove the portions from memory before proceeding to other portions for processing, thereby reducing memory consumption resulting from loading the graph data model into memory.

Figure 2:
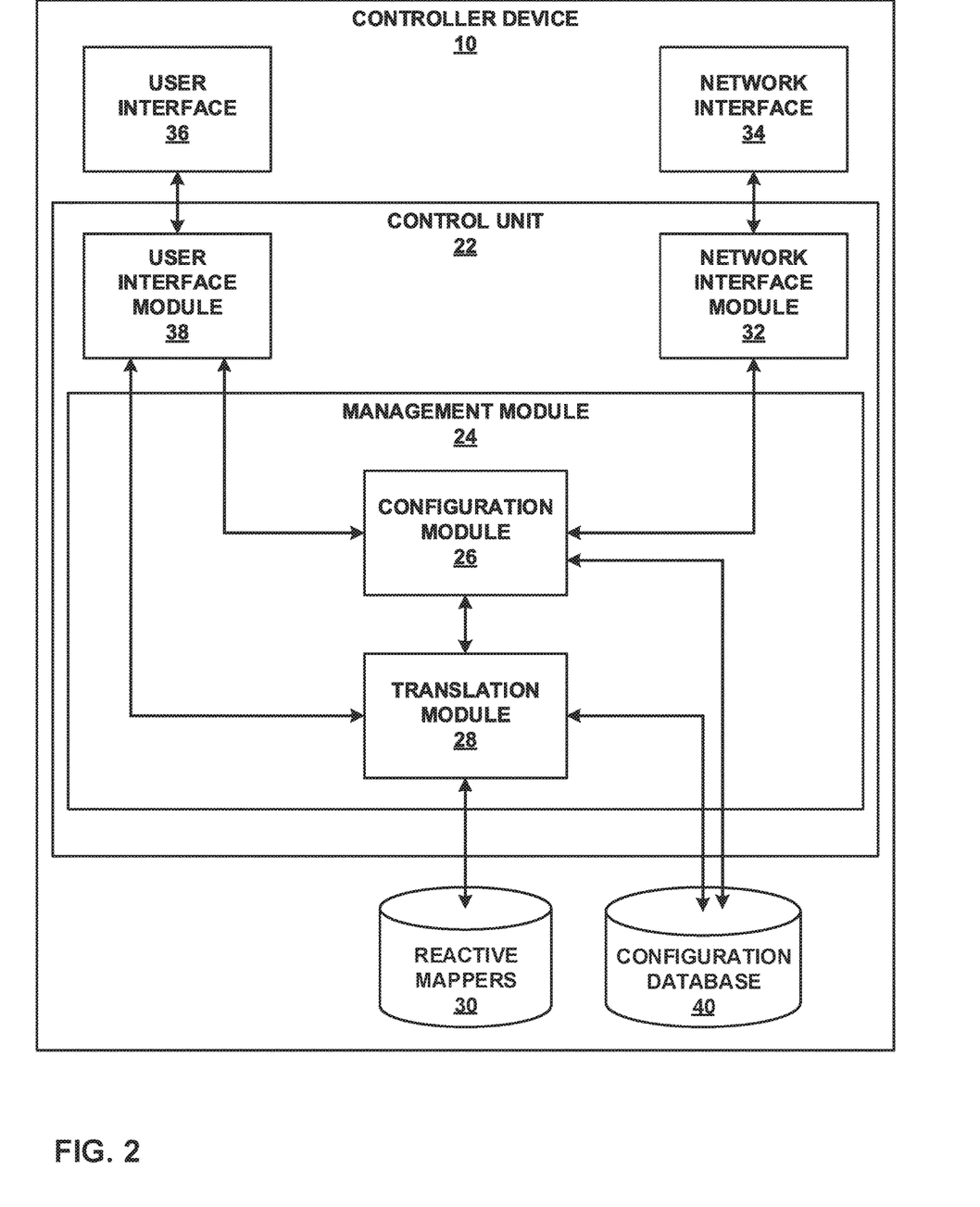
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/big/n or other such wireless protocols), Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrators 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., elements 14 of FIG. 1. Management includes, for example, configuring the network devices according to instructions received from a user (e.g., administrators 12 of FIG. 1) and providing the user with the ability to submit instructions to configure the network devices. In this example, management module 24 further includes configuration module 26 and translation module 28.

Management module 24 is configured to receive intent unified-graph-modeled configuration data for a set of managed network devices from a user, such as administrators 12. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAW such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 also provides the user with the ability to submit reactive mappers that translation module 28 executes to transform the intent data model to device-specific, low-level configuration instructions.

Controller device 10 also includes configuration database 40. Configuration database 40 generally includes information describing managed network devices, e.g., elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., intent data model, or in some cases, both intent data model and low-level configuration information) for the managed devices (e.g., elements 14).

Translation module 28 determines which of reactive mappers 30 to execute on the intent data model based on the information of configuration database 40, e.g., which of the devices are to receive the low-level configuration instructions. Translation module 28 then executes each of the determined reactive mappers of reactive mappers 30, providing the intent data model to the reactive mappers as input and receiving low-level configuration instructions. Translation module 28 may also be referred to as an intent compiler, which is a service containing a set of mappers, such as reactive mappers 30.

Configuration module 26 may first determine an existing intent data model for each service performed by the devices for which configuration is to be updated, e.g., by retrieving the intent data model for each of the services from configuration database 40. Configuration module 26 may then compare the existing intent data model (also referred to herein as a deployed graph model) to the newly received intent data model, and determine differences between the existing and newly received intent data models (also referred to as an undeployed graph model). Configuration module 26 may then add these changes to the compiler stream, and reactive mappers 30 may then translate these changes to low-level configuration information. The changes may be included in a change set, which may be a list containing intent graph vertices and corresponding version identifiers. Management module 24 may use the change set to track the list of vertices changed in an intent update. After the intent has been committed, management module 24 may use the change set to update vertex states in the intent graph model. Configuration module 26 also updates the existing intent data model recorded in configuration database 40 based on the newly received intent data model.

In some examples, reactive mappers 30 that perform update translations (that is, translating changes in the unified intent data model that results in updates to values of low-level configuration information, without creation or deletion of elements in the low-level configuration data) may operate as follows. In one example, the reactive mappers 30 that perform updates may override single elements. That is, performance of these reactive mappers may result in deletion of an element value, e.g., by replacing an old element value with a new value. Sometimes, a single value in a configuration service model can be mapped to a list in a device configuration. In these cases, translation module 28 may send the old value as well as the new value.

Translation module 28 (which may be configured according to reactive mappers 30) may use the same reactive mapper for creation, updates, and deletion of intent data model vertices. Because each vertex has its own corresponding reactive mapper, compilation can be performed in parallel. That is, the reactive mappers of each of the vertices of the graph model representing the unified intent data model can be executed in parallel, thereby achieving parallel compilation. Translation module 28 may be configured to allow processing of only impacted intent data model data changes (i.e., those elements in the intent data model that are impacted by the changes). Based on reactive mappers 30, translation module 28 may infer dependencies across vertices in the intent data model. When the intent data model is changed, translation module 28 may publish messages in the compiler stream based on a dependency graph, as discussed above.

When a "create" template is uploaded (that is, a reactive mapper of reactive mappers 30 that processes new data in intent data model configuration information, relative to existing intent data model configuration information), translation module 28 may determine the dependencies using the dependency graph. When the service is changed, translation module 28 may generate a difference between the existing intent data model configuration information and the new intent data model configuration information, based on the dependencies. Translation module 28 may then use the reactive mapper of reactive mappers 30 to process the difference, and thereby translate the intent data model configuration information to low-level configuration instructions, Translation module 28 may then provide the low-level configuration instructions to configuration module 28.

After receiving the low-level configuration instructions from translation module 28, configuration module 28 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrators 12 (FIG. 1) to interact with controller device 10, other interfaces may be used in other examples. For example, controller device 10 may include a representational state transfer (REST) client (not shown) that may act as an interface to another device, by which administrators 12 may configure controller device 10. Likewise, administrators 12 may configure elements 14 by interacting with controller device 10 through the REST client.

Management module 24 may model configuration database 40 as a graph data structure (or graph database) representing YANG configuration data elements. YANG specifies various types of data structures, including lists, leaflists, containers, containers with presence, and features. Management module 24 may model each of lists, containers, containers with presence, and features, as well as a top-level container, as vertices in a graph data structure. Alternatively, configuration database 40 may represent YAML configuration data elements.

After constructing the graph data structure, management module 24 may perform operations on data of the graph data structure. For example, management module 24 may map Netconf-based operations, such as get-config, get-config with filters, and edit-config, to graph query language queries, such as Gremlin queries. Gremlin is described in GremlinDocs at gremlindocs.spmallette.documentup.com and in github.com/tinkerpop/gremlin/wiki. Management module 24 may execute conditions mapped to vertices and edges of the graph data structure if the condition attributes are changed. In response to the conditions, management module 24 may process additional changes, handled as functions as discussed in greater detail below. Management module 24 may further update all changes in transaction semantics.

In some examples, management module 24 may store configuration information of elements 14 in operative memory (e.g., random access memory (RAM), or "runtime memory"), Rather than loading confirmation information for all of elements 14 into operative memory simultaneously, management module 24 may load configuration information for only a subset of elements 14 for a period of time during which management module 24 may manage (e.g., configure) those of elements 14 for which the configuration information is loaded. Furthermore, management module 24 may iteratively load and unload configuration information for elements 14 in this manner, to process configuration information for all of elements 14.

In accordance with the techniques of this disclosure, management module 24 may determine types of resources provided by elements 14, and then construct a topologically sorted directed acyclic graph (DAG) representing the resources provided by elements 14. Using the sorted DAG, management module 24 may query elements 14 in order of dependencies between the various resource types to determine which of elements 14 to query to determine resources of the various types. Configuration module 26 may then issue configuration instructions to elements 14 to modify the configuration of elements 14, to avoid disrupting dependencies between the resources and also to load configuration information of a subset of elements 14 into operative memory, rather than all of elements 14. In this manner, memory consumption during configuration operations can be reduced. Furthermore, management module 24 may query and configure elements 14 at a common level of the sorted DAG in parallel, thereby decreasing the time needed to manage or configure elements 14.

Figure 3:
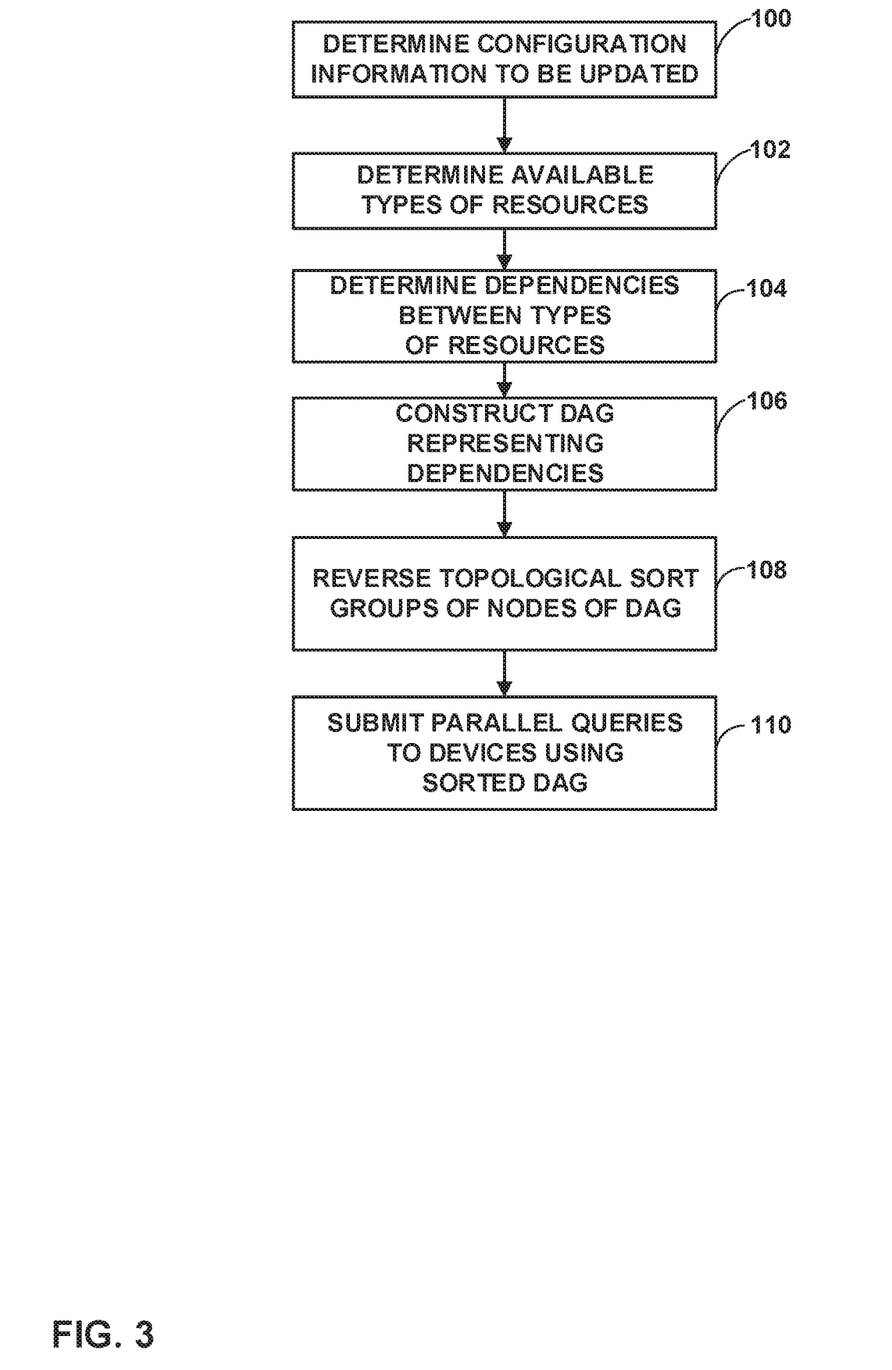
FIG. 3 is a flowchart illustrating an example method of managing a plurality of network devices according to the techniques of this disclosure.

In this manner, controller device 10 represents an example of a controller device that manages a plurality of network devices and includes one or more processors implemented in circuitry and configured to determine that configuration of one or more network devices of the plurality of network devices is to be updated; determine dependencies between types of resources provided by the network devices; construct a directed acyclic graph (DAG) representing the dependencies, the DAG having nodes representing the corresponding types of resources of the network devices of the plurality of network devices; sort the nodes of the DAG according to a grouped topological sort into a plurality of hierarchical levels according to the dependencies; and submit queries for two or more resources of the network devices at a common level of the plurality of hierarchical levels in parallel to determine resources of the determined types of resources of the two or more resources to configure the two or more network devices, FIG. 3 is a flowchart illustrating an example method of managing a plurality of network devices according to the techniques of this disclosure. For purposes of example and explanation, the method of FIG. 3 is explained with respect to controller device 10 of FIGS. 1 and 2. However, other devices may be configured to perform this or a similar method.

Initially, management module 24 determines that configuration information of elements 14 is to be updated (100). For example, controller device 10 may receive input from one of administrators 12 (FIG. 1) representing updates to be made to elements 14. As one example, controller device 10 may receive high-level configuration information to be translated into low-level (device-level) configuration instructions by translation module 28. The received configuration changes may indicate certain types of resources that are to be reconfigured, such as forwarding tables, routing tables, network access policies (e.g., for access by certain users, firewall policies, or the like), or other such resources.

According to the techniques of this disclosure, configuration database 40 of controller device 10 may store types of resources provided by various types of elements 14. Thus, management module 24 may determine the types of resources provided by various elements 14 (102), e.g., from configuration database 40. Using the information representing the types of resources, management module 24 may determine dependencies between the various types of resources (104). For example, if one or more of elements 14 is a router, routing instances of the router may be dependent on network interfaces of the router. Both routing instances and network interfaces are examples of types of resources provided by the router.

After determining the dependencies between the types of resources, management module 24 may construct a directed acyclic graph (DAG) representing the dependencies (106). That is, when a first resource type depends on a second resource type, management module 24 may construct the DAG to include a first node representing the first resource type, a second node representing the second resource type, and an edge from the first node to the second node. Management module 24 may construct nodes and edges of the DAG for each type of resource provided by elements 14.

After constructing the DAG, management module 24 may perform a reverse topological sort on groups of nodes of the DAG (108). That is, management module 24 may place the nodes into groups at common dependency levels. An example method for performing the reverse topological sort is described in greater detail below with respect to FIG. 4. Management module 24 may further construct a reverse topological sort order dictionary having, for each of the hierarchical levels of the sorted DAG, data representing node groups including nodes at the hierarchical level and numbers of outgoing edges of the nodes.

After sorting the DAG, management module 24 may submit parallel queries to managed network devices (e.g., elements 14) using the sorted DAG and the dictionary (110). An example method of submitting parallel queries is described with respect to FIG. 5. In general, management module 24 may submit parallel queries to each of elements 14 that are at a common level of the sorted DAG.

In this manner, the method of FIG. 3 represents an example of a method of managing a plurality of network devices including determining that configuration of one or more network devices of the plurality of network devices is to be updated; determining dependencies between types of resources provided by the network devices; constructing a directed acyclic graph (DAG) representing the dependencies; the DAG having nodes representing the corresponding types of resources of the network devices of the plurality of network devices; sorting the nodes of the DAG according to a grouped topological sort into a plurality of hierarchical levels according to the dependencies; and submitting queries for two or more resources of the network devices at a common level of the plurality of hierarchical levels in parallel to determine resources of the determined types of resources of the two or more resources to configure the two or more network devices.

Figure 4:
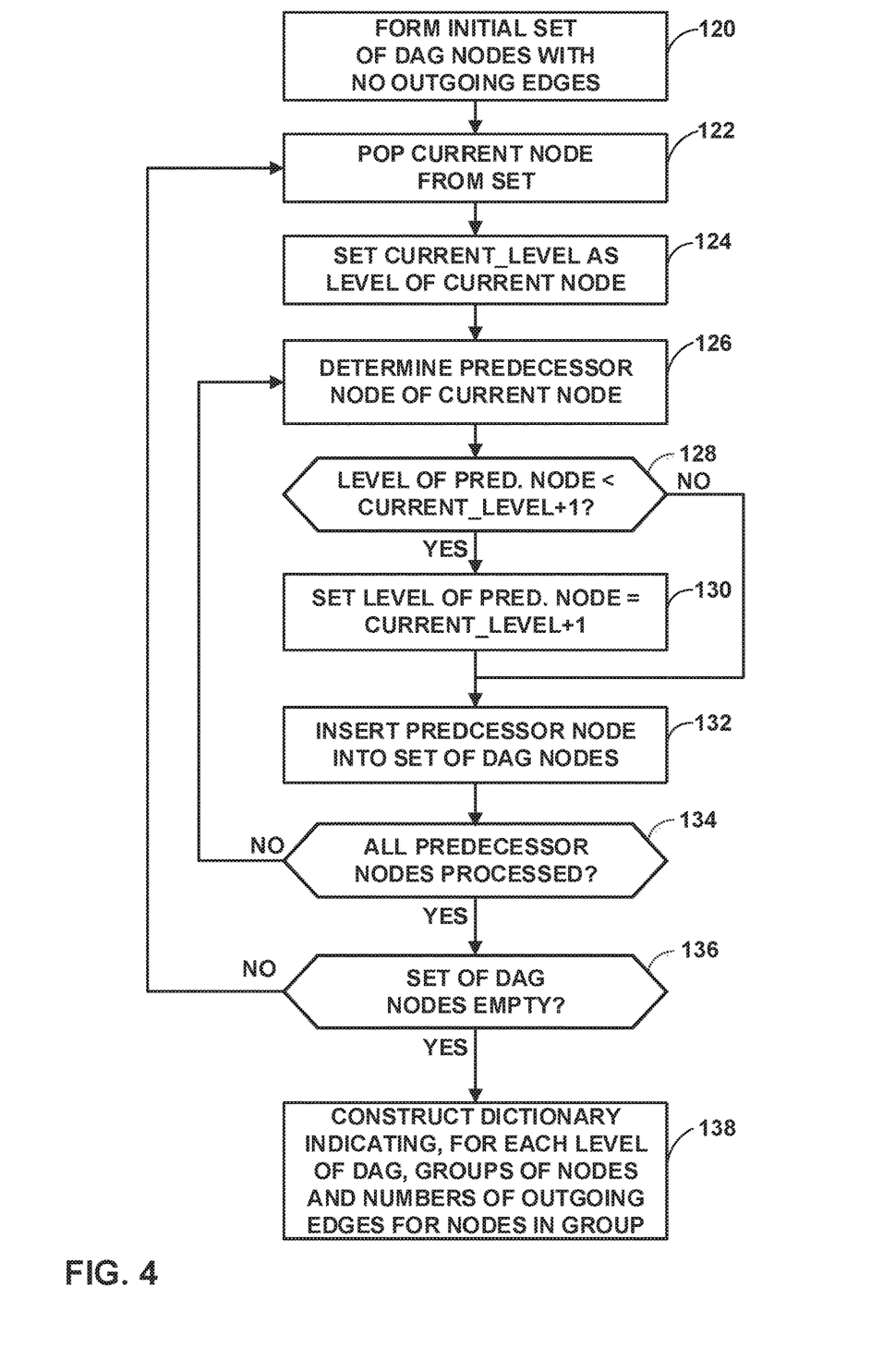
FIG. 4 is a flowchart illustrating an example method of topologically sorting a directed acyclic graph according to the techniques of this disclosure.

FIG. 4 is a flowchart illustrating an example method of topologically sorting a directed acyclic graph (DAG) according to the techniques of this disclosure. Controller device 10 of FIGS. 1 and 2 may be configured to perform the method of FIG. 4 as part of sorting a DAG, e.g., corresponding to step 108 of FIG. 3.

Initially, management module 24 (FIG. 2) may start with an unsorted DAG representing dependencies between types of resources provided by elements 14 (FIG. 1). In particular, the DAG may include a set of edges representing types of resources, and edges between the nodes representing dependencies. Management module 24 may initialize level values for all nodes of the DAG to a value of zero.

Management module 24 may initialize a set of DAG nodes having no outgoing edges (120). This set may be referred to as simply a "set of DAG nodes" below and generally, represents a set of nodes of the DAG that are ready to be processed and sorted. Management module 24 may then pop a node from the set (referred to as the "current node") (122). Management module 24 may then set a value for a current_level variable equal to the level value of the current node (124). Management module 24 may then determine a predecessor node to the current node (126).

If the level of the predecessor node is less than the value of current_level+1 ("YES" branch of 128), management module 24 may set the level of the predecessor node equal to current_level+1 (130). Otherwise, if the level of the predecessor node is greater than or equal to the value of current_level+1 ("NO" branch of 128), management module 24 may skip adjusting the value of the predecessor node. In either case, management module 24 may insert the predecessor node into the set of DAG nodes (132).

Management module 24 may then determine whether all predecessor nodes to the current node have been processed (134). If there is at least one remaining predecessor node to the current node ("NO" branch of 134), management module 134 may proceed to determine the predecessor node of the current node, adjust the level of the predecessor node if necessary, and insert the predecessor node into the set of DAG nodes, per steps 126-132.

Once all predecessor nodes to the current node have been processed ("YES" branch of 134), management module 24 may determine whether the set of DAG nodes is empty (136). If the set of DAG nodes is not empty ("NO" branch of 136), management module 24 may pop a new node as the current node and proceed to adjust levels of the predecessor nodes to the current node per steps 122-132, as discussed above.

When the set of DAG nodes is empty ("YES" branch of 136), management module 24 may construct a reverse topological sort order dictionary indicating, for each level of the sorted DAG, groups of nodes at that level and numbers of outgoing edges for the nodes in each group (138). In this manner, management module 24 may construct a reverse topological sort order dictionary having, for each of the hierarchical levels of the DAG, data representing node groups including nodes at the hierarchical level and numbers of outgoing edges of the nodes.

The following pseudocode represents an example algorithm for performing the method of FIG. 4 as discussed above:

G←Directed acyclic graph and mark level as 0 for all nodes
D←Reverse topological sort order dictionary
Initialize S with the set of all nodes with no outgoing edges
  while S is non-empty {
  Pop a node n from S
  set current_level as level of node n
  for each node m predecessor of n {
    if level of node m is less than current_level+1 then

```
    set the level of node m as current_level+1
    Insert node m into S
  }
 }
}
for each node n in G {
D[level of n]←{number of outgoing edges of n}
}
```

Figure 5:
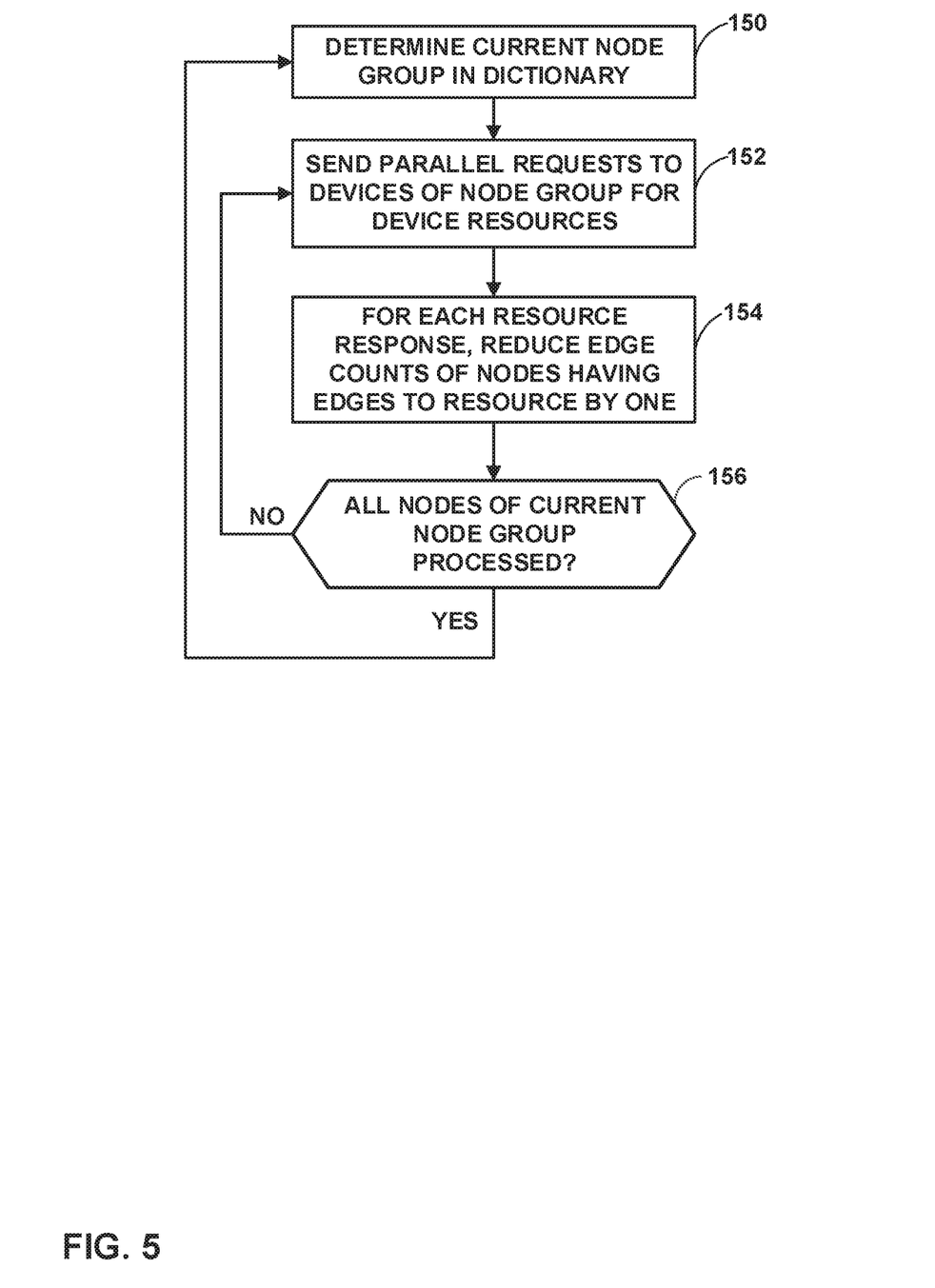
FIG. 5 is a flowchart illustrating an example method of querying devices providing resources according to a topologically sorted directed acyclic graph according to the techniques of this disclosure.

FIG. 5 is a flowchart illustrating an example method of querying devices providing resources according to a topologically sorted directed acyclic graph according to the techniques of this disclosure. Management module 24 of FIG. 2 may perform the method of FIG. 5 as part of step 110 of FIG. 3. In general, management module 24 may query devices (e.g., elements 14) in order of the reverse topological sorted DAG produced following FIG. 4 as discussed above, using the dictionary constructed as discussed above.

In particular, management module 24 may determine a current node group in the dictionary (150). The dictionary may be sorted in the same order as the sorted DAG, where a dictionary entry D[n] includes node groups at hierarchical level n and numbers of outgoing edges for nodes of the node group at level n.

Management module 24 may send parallel requests to devices of the node group to determine resources of the devices (152). For each resource response, management module 24 may reduce the edge count of nodes having edges to the resource by one (154). Although not shown in FIG. 5, management module 24 may also send configuration information to a device after having received the resource responses.

Management module 24 may then determine whether all nodes of the current group have been processed (156). If not all nodes of the node group have been processed ("NO" branch of 156), management module 24 may send additional requests, in parallel, to other devices of the current node group per step 152. After all nodes of the node group have been processed ("YES" branch of 156), management module 24 may proceed to the next node group in order (e.g., n=n+1).

The following pseudocode represents an example algorithm for performing the method of FIG. 5 as discussed above:

```
N←The number of parallel requests which device supports
D←The grouped topological order generated by above algorithm
for (n=0; n<size of D; n++) {
Send N requests in parallel for synchronizing resources in
    node-group D[n]
for each resource R which response is received
    find the nodes in the graph from which we have an edge
        to R
    reduce the ecnt by 1//ecnt is the number of outgoing
        edges
If all the nodes in the current node group is exhausted
    Take up next node-group
else
    take the node with cent=0 as next node to query
}
```

Figure 6:
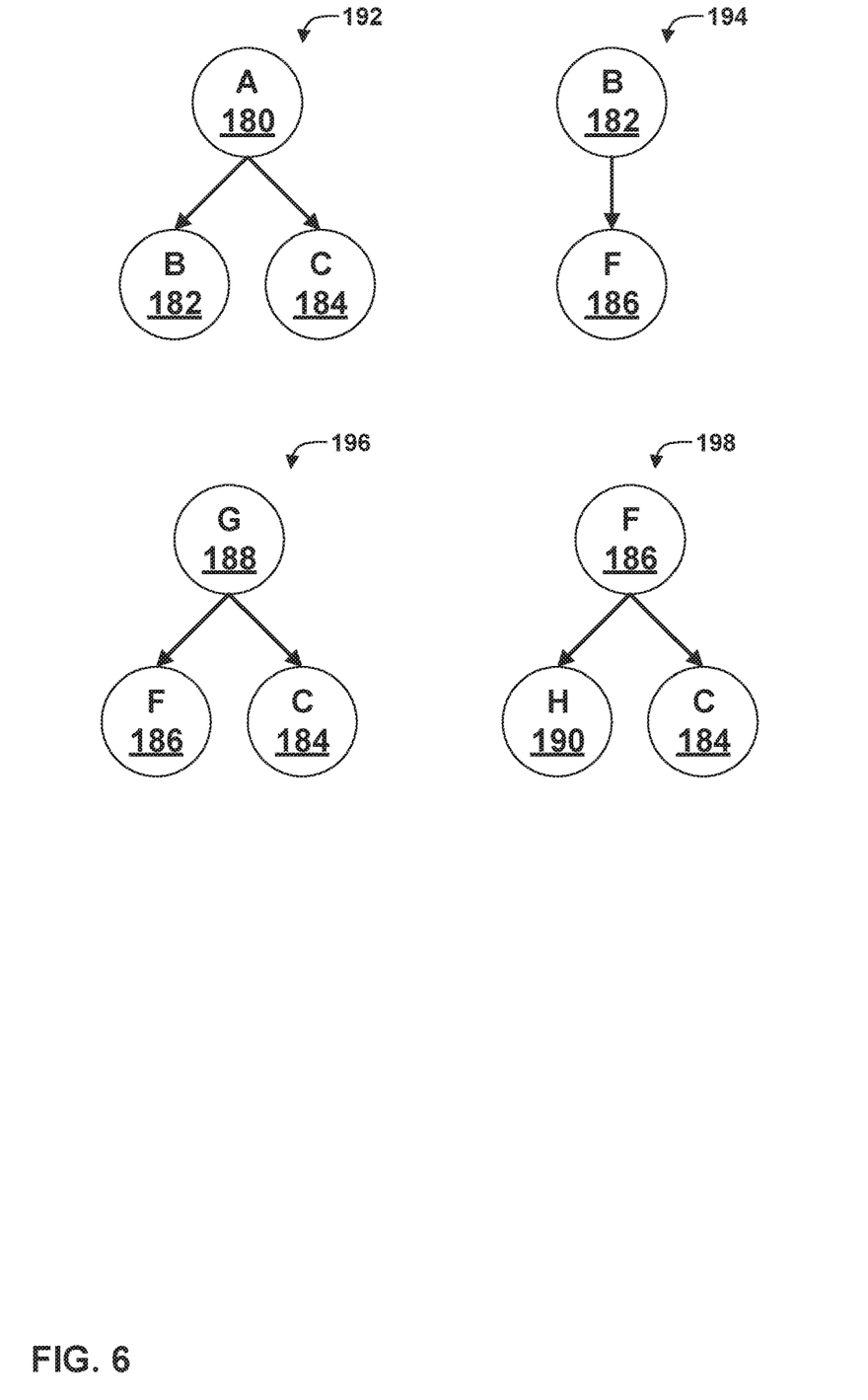
FIG. 6 is a conceptual diagram illustrating example graphs representing dependencies between resources.

FIG. 6 is a conceptual diagram illustrating example graphs 192, 194, 196, 198, representing dependencies between types of resources. Management module 24 (FIG. 2) may construct these graphs to represent dependencies between types of resources. In the example of FIG. 6, types of resources are represented by nodes A 180, B 182, C 184, F 186, G 188, and H 190. In the example of FIG. 6, an from a first node to a second node indicates that the first resource type represented by first node depends on the second resource type represented by the second node.

In this example, graph 192 includes node A 180 that depends on nodes B 182 and C 184. Graph 194 includes node B 182 that depends on node F 186. Graph 196 includes node G 188 that depends on nodes F 186 and C 184. Graph 198 includes node F 186 that depends on nodes H 190 and C 184.

Management module 24 may determine interdependencies between types of resources to construct graphs 192, 194, 196, and 198. In most EMS applications, types of resources are modeled as objects. For example, the objects may be modeled using YAML, and within the YAML model, one object type may refer to a dependent object type. Relations between resource types may be represented as references in the object. Thus, management module 24 may construct graphs 192, 194, 196, and 198 using references in a YAML object model, which may be stored in, e.g., configuration database 40 (FIG. 2). In general, a dependency between a parent node and a child node means that the resources corresponding to the child node need to be queried and persisted before querying objects of the parent node.

Figure 7:
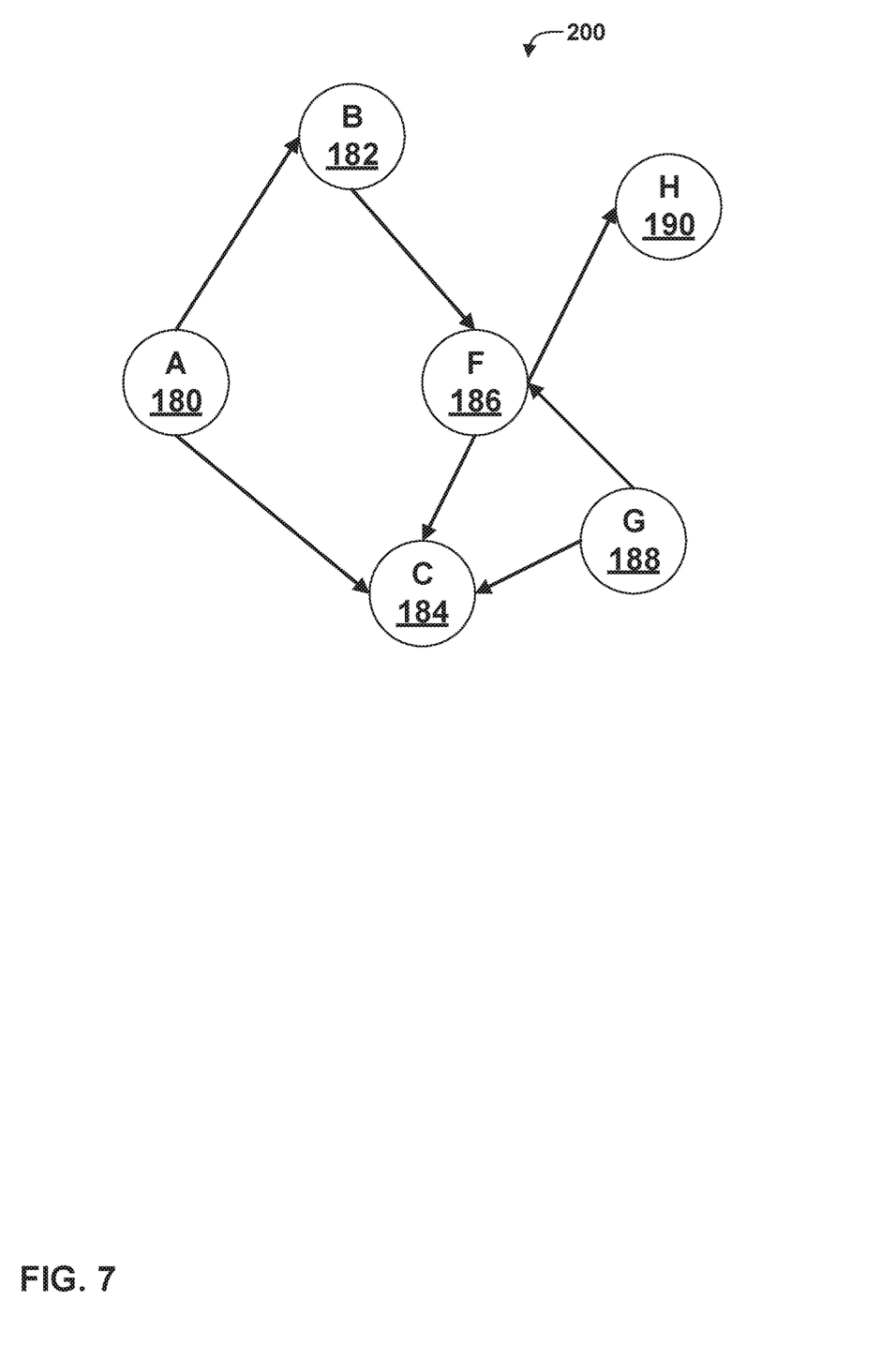
FIG. 7 is a conceptual diagram illustrating an example directed acyclic graph according to the dependencies between resources of FIG. 6.

FIG. 7 is a conceptual diagram illustrating an example directed acyclic graph (DAG) 200 according to the dependencies between resources of FIG. 6. Management module 24 may construct DAG 200 from graphs 192, 194, 196, 198 of FIG. 6. In general, management module 24 constructs DAG 200 by merging graphs 192, 194, 196, and 198. For example, graph 192 and graph 194 each include node B 182. Therefore, management module 24 may merge graphs 192 and 194 by merging nodes B 182, such that there is a single path from node A 180 to node B 182 to node F 186. Graph 196 also includes node F 186 as a child node, and therefore, management module 24 may add node G 188 with an edge to node F 186, as well as an edge from node G 188 to node C 184. Management module 24 may further add node H 190 from graph 198 and an edge from node F 186 to node H 190, as well as an edge from node F 186 to node C 184. In this manner, management module 24 may construct DAG 200.

Figure 8:
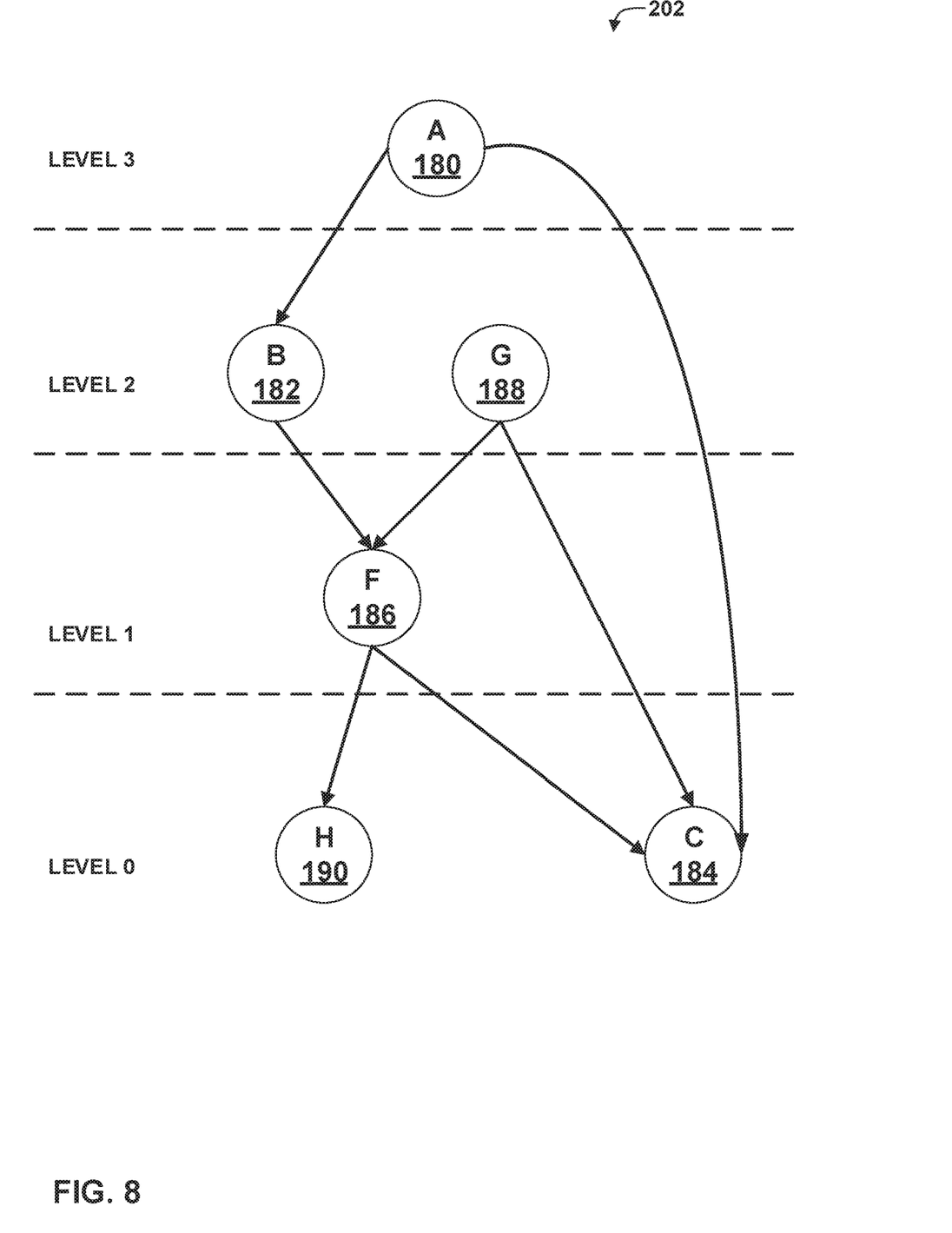
FIG. 8 is a conceptual diagram illustrating an example topologically sorted version of the directed acyclic graph of FIG. 7.

FIG. 8 is a conceptual diagram illustrating an example topologically sorted DAG 202 of DAG 200 of FIG. 7. As shown in FIG. 8, topologically sorted DAG 202 includes the same nodes and edges as DAG 200, but further includes indications of hierarchical levels for the nodes.

Management module 24 may perform the method of FIG. 4 to construct topologically sorted DAG 202 from DAG 200 and to determine the levels for the various nodes. For example, management module 24 may initially set level values for all of the nodes of DAG 200 equal to zero and determine that the initial set of nodes of DAG 200 includes nodes H 190 and C 184, because these nodes have no outgoing edges.

Management module 24 may then pop, for example, node H 190 as the current node. Management module 24 may set the variable current_level equal to the level of node H 190, i.e., zero in this case. Management module 24 may then determine that node H 190 has one predecessor node F 186. The level of node F 186 is also zero, which is less than current_level+1, so management module 24 sets the level of node F 186 equal to current_level+1 (i.e., one). Management module 24 then adds node F 186 to the set of nodes to be processed.

Node F 186 is the only predecessor node of node H 190, so management module 24 pops a next node of the set of nodes, e.g., node C 184. Management module 24 initializes current_level to the value of the level of node C 184, i.e., zero. Node C 184 has three predecessor nodes: node F 186, node G 188, and node A 180. Node F 186, in this example, has a level value of 1, which is equal to current_level+1, so management module 24 does not change the level value of node F 186, and node F 186 is already in the set of nodes. Management module 24 sets the level values of nodes G 188 and A 180 equal to 1, i.e., current_level+1, and adds nodes G 188 and A 180 to the set of nodes to be processed.

Management module 24 may then pop node F 186 from the set of nodes to be processed. Node F 186 has a level value of 1 and two predecessor nodes, nodes B 182 and G 188. Management module 24 sets current_level equal to 1 and updates the level values of nodes B 182 and G 188 to 2 (current_level+1), and adds node B 182 to the set of nodes to be processed.

Management module 24 may then pop node G 188. Node G 188 has no predecessor nodes, so management module 24 need not further process node G 188.

Management module 24 may then pop node B 182. Node B 182 has a level value of 2 and one predecessor node, node A 180. Thus, management module 24 may set current_level equal to 2. Management module 24 may update the level value of node A 180 to 3 (current_level±1). Node A 180 is already in the set of nodes to be processed in this example, so management module 24 may stop processing node B 182.

Finally, management module 24 may pop node A 180. Node A 180 does not have any predecessor nodes, so management module 24 may stop processing node A 180, In this example, at this point, the set of nodes to be processed is empty. Therefore, management module 24 may construct a reverse topological sort order dictionary. This dictionary may indicate that level 0 of the hierarchy includes node H 190 with an ecnt (outgoing edge count) of 0 and node C 184 with an ecnt of 0. The dictionary may indicate that level 1 of the hierarchy includes node F 186 with an ecnt of 2. The dictionary may indicate that level 2 has node B 182 with an ecnt of 1 and node G 188 with an ecnt of 2. The dictionary may indicate that level 3 has node A 180 with an ecnt of L.

Management module 24 may generally use topologically sorted DAG 202 and the corresponding dictionary to generate a sequence of nodes that can be queried in parallel and with some dependencies, as discussed above.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only, memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method of managing a plurality of network devices, the method comprising:
   determining that configuration of one or more network devices of the plurality of network devices is to be updated;
   determining dependencies between types of resources provided by network devices;
   constructing a directed acyclic graph (DAG) representing the dependencies, the DAG having nodes representing the corresponding types of resources of the network devices of the plurality of network devices;
   sorting the nodes of the DAG according to a grouped topological sort into a plurality of hierarchical levels according to the dependencies; and
   submitting queries for two or more resources of the network devices at a common level of the plurality of hierarchical levels in parallel to determine resources of the determined types of resources of the two or more resources to configure the two or more network devices.

2. The method of claim 1, wherein determining the dependencies comprises determining that a first type of resource depends on a second type of resource when configuration information for the first type of resource refers to configuration information for the second type of resource.

3. The method of claim 1, wherein constructing the DAG comprises creating a graph edge from a first node of the DAG to a second node of the DAG when a first type of resource of a first network device corresponding to the first node depends on a second type of resource of a second network device corresponding to the second node.

4. The method of claim 1, wherein constructing the DAG comprises, for all pairs of nodes of the DAG having a dependency between the nodes, creating an edge between the nodes.

5. The method of claim 1, wherein sorting the nodes comprises:
   marking levels for all nodes of the DAG as level 0;
   initializing a set of nodes of the DAG to include nodes of the DAG having zero outgoing edges;
   while the set of nodes is non-empty:
     removing a node from the set of nodes;

determining a current level value as the level of the node; and for each predecessor node of the node, inserting the predecessor node into the set of nodes and, if the predecessor node has a level less than the current level, incrementing the current level value.

6. The method of claim 5, further comprising constructing a reverse topological sort order dictionary having, for each of the hierarchical levels of the DAG, data representing node groups including nodes at the hierarchical level and numbers of outgoing edges of the nodes.

7. The method of claim 6, wherein querying the two or more network devices comprises, for each node group of the reverse topological sort order dictionary:

sending request for synchronizing resources of the node in parallel;

for each of the resources for which a response is received, determining nodes of the sorted DAG from which there is an edge to the resource and reducing data representing the number of outgoing edges by one; and proceeding to a next node of the node group having a value of zero for the data representing the number of outgoing edges or, if there are no next nodes of the node group, a next node group of the node groups of the reverse topological sort order dictionary.

8. A controller device that manages a plurality of network devices, the controller device comprising one or more processors implemented in circuitry and configured to:

determine that configuration of one or more network devices of the plurality of network devices is to be updated;

determine dependencies between types of resources provided by the network devices;

construct a directed acyclic graph (DAG) representing the dependencies, the DAG having nodes representing the corresponding types of resources of the network devices of the plurality of network devices;

sort the nodes of the DAG according to a grouped topological sort into a plurality of hierarchical levels according to the dependencies; and submit queries for two or more resources of the network devices at a common level of the plurality of hierarchical levels in parallel to determine resources of the determined types of resources of the two or more resources to configure the two or more network devices.

9. The controller device of claim 8, wherein the one or more processors are configured to determine that a first type of resource depends on a second type of resource when configuration information for the first type of resource refers to configuration information for the second type of resource.

10. The controller device of claim 8, wherein to construct the DAG, the one or more processors are configured to create a graph edge from a first node of the DAG to a second node of the DAG when a first type of resource of a first network device corresponding to the first node depends on a second type of resource of a second network device corresponding to the second node.

11. The controller device of claim 8, wherein to construct the DAG, the one or more processors are configured to, for all pairs of nodes of the DAG having a dependency between the nodes, create an edge between the nodes.

12. The controller device of claim 8, wherein to sort the nodes, the one or more processors are configured to:

mark levels for all nodes of the DAG as level 0;

initialize a set of nodes of the DAG to include nodes of the DAG having zero outgoing edges;

while the set of nodes is non-empty:

remove a node from the set of nodes;

determine a current level value as the level of the node; and for each predecessor node of the node, insert the predecessor node into the set of nodes and, if the predecessor node has a level less than the current level, increment the current level value.

13. The controller device of claim 12, wherein the one or more processors are further configured to construct a reverse topological sort order dictionary having, for each of the hierarchical levels of the DAG, data representing node groups including nodes at the hierarchical level and numbers of outgoing edges of the nodes.

14. The controller device of claim 13, wherein to query the two or more network devices, the one or more processors are configured to, for each node group of the reverse topological sort order dictionary:

send request for synchronizing resources of the node in parallel;

for each of the resources for which a response is received, determine nodes of the sorted DAG from which there is an edge to the resource and reducing data representing the number of outgoing edges by one; and proceed to a next node of the node group having a value of zero for the data representing the number of outgoing edges or, if there are no next nodes of the node group, a next node group of the node groups of the reverse topological sort order dictionary.

15. A computer-readable storage medium having stored thereon instructions that, when executed, cause a processor of a controller device that manages a plurality of network devices to:

determining that configuration of one or more network devices of the plurality of network devices is to be updated;

determining dependencies between types of resources provided by the network devices;

constructing a directed acyclic graph (DAG) representing the dependencies, the DAG having nodes representing the corresponding types of resources of the network devices of the plurality of network devices;

sorting the nodes of the DAG according to a grouped topological sort into a plurality of hierarchical levels according to the dependencies; and submitting queries for two or more resources of the network devices at a common level of the plurality of hierarchical levels in parallel to determine resources of the determined types of resources of the two or more resources to configure the two or more network devices.

16. The computer-readable storage medium of claim 15, wherein the instructions that cause the processor to determine the dependencies comprise instructions that cause the processor to determine that a first type of resource depends on a second type of resource when configuration information for the first type of resource refers to configuration information for the second type of resource.

17. The computer-readable storage medium of claim 15, wherein the instructions that cause the processor to construct the DAG comprise instructions that cause the processor to, for all pairs of nodes of the DAG having a dependency between the nodes, create a graph edge from a first node of the pair to a second node of the pair when a first type of resource of a first network device corresponding to the first node depends on a second type of resource of a second network device corresponding to the second node.

18. The computer-readable storage medium of claim 15, wherein the instructions that cause the processor to sort the nodes comprise instructions that cause the processor to:
- mark levels for all nodes of the DAG as level 0;
- initialize a set of nodes of the DAG to include nodes of the DAG having zero outgoing edges;
- while the set of nodes is non-empty:
  - remove a node from the set of nodes;
  - determine a current level value as the level of the node; and
  - for each predecessor node of the node, insert the predecessor node into the set of nodes and, if the predecessor node has a level less than the current level, increment the current level value.

19. The computer-readable storage medium of claim 18, further comprising instructions that cause the processor to construct a reverse topological sort order dictionary having, for each of the hierarchical levels of the DAG, data representing node groups including nodes at the hierarchical level and numbers of outgoing edges of the nodes.

20. The computer-readable storage medium of claim 19, wherein the instructions that cause the processor to query the two or more network devices comprise instructions that cause the processor to, for each node group of the reverse topological sort order dictionary:
- send request for synchronizing resources of the node in parallel;
- for each of the resources for which a response is received, determine nodes of the sorted DAG from which there is an edge to the resource and reducing data representing the number of outgoing edges by one; and
- proceed to a next node of the node group having a value of zero for the data representing the number of outgoing edges or, if there are no next nodes of the node group, a next node group of the node groups of the reverse topological sort order dictionary.

* * * * *